Figure 1:
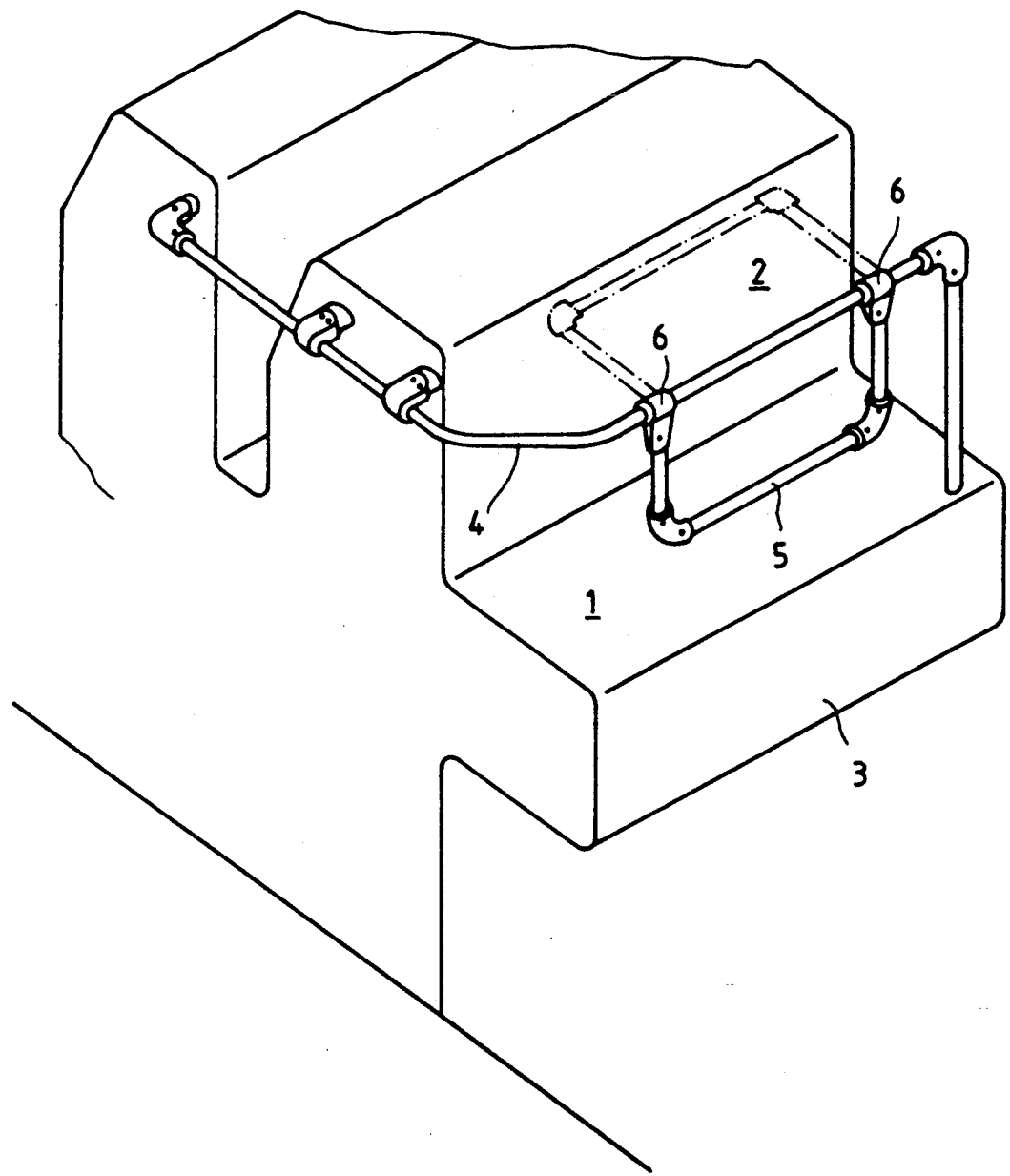

United States Patent [19]

Gund

[11] Patent Number: 5,197,717

[45] Date of Patent: Mar. 30, 1993

[54] SAFETY DEVICE FOR PROTECTING PERSONNEL AGAINST FALLING FROM A PLATFORM OF A PRINTING PRESS

[75] Inventor: Michael Gund, Plankstadt, Fed. Rep. of Germany

[73] Assignee: Heidelberger Druckmaschinen AG, Heidelberg, Fed. Rep. of Germany

[21] Appl. No.: 905,476

[22] Filed: Jun. 29, 1992

[30] Foreign Application Priority Data

Jul. 3, 1991 [DE] Fed. Rep. of Germany ....... 4121992

[51] Int. Cl.⁵ ............................................. E04H 17/14
[52] U.S. Cl. .......................................... 256/59; 256/1; 256/13
[58] Field of Search .......................... 256/59, 13, 65, 1

[56] References Cited

U.S. PATENT DOCUMENTS

| 3,148,746 | 9/1964 | Juculano | 256/59 X |
| 3,662,993 | 5/1972 | Lionetto | 256/65 |
| 4,669,683 | 6/1987 | Guillory | 256/1 X |

FOREIGN PATENT DOCUMENTS 83182934  3/1984  Fed. Rep. of Germany.

Primary Examiner—Andrew V. Kundrat
Attorney, Agent, or Firm—Herbert L. Lerner; Laurence A. Greenberg

[57] ABSTRACT

A safety device for protecting personnel against falling from a platform of a printing press having a handrail anchored to the printing press, and a kneerail located below the handrail, including devices for swiveling the kneerail and devices for releasably locking the kneerail both in an inwardly swiveled position wherein it blocks access to the platform, and in a normal position wherein it is disposed below the handrail.

6 Claims, 2 Drawing Sheets

SAFETY DEVICE FOR PROTECTING PERSONNEL AGAINST FALLING FROM A PLATFORM OF A PRINTING PRESS

The invention relates to a safety device for protecting personnel against falling from a platform of a printing press, and, more particularly, to such a safety device having a handrail anchored to the printing press, and a kneerail located below the handrail.

Such safety devices for protecting personnel against falling comply with safety precautions for the protection of personnel working on the platform and conform with accident-prevention regulations. When work is being performed on the printing press from the floor, however, the safety devices prove to be a hindrance, because the kneerail is situated approximately at head height of the persons doing the work. The kneerail thus impedes work from the floor and also represents a potential source of danger. Heretofore, the parts of such safety devices have been fixed in position. Also known heretofore is a partially removable type of fastening, which, however, results in a circumvention of the purpose for such a safety device because the removable parts of the fastening device are frequently not reinstalled after the necessary work on the printing press has been completed.

Heretofore known from German Petty Patent or Gebrauchsmuster 83 18 293 is a movable door provided in a gap formed in a protective railing of metal-tube scaffolds, the door likewise having an upper handrail and a kneerail, and being hinged on one side so as to be swivelable, against spring loading, about the hinge which has a vertical swivel axis, so that the door subsequently returns automatically to a closed position.

It is accordingly an object of the invention to provide a safety device for protecting personnel against falling from a platform on a printing press, so that at least a part thereof which impedes work on the printing press from the floor is movably anchored and, if moved, bars access to the platform.

With the foregoing and other objects in view, there is provided in accordance with the invention, a safety device for protecting personnel against falling from a platform of a printing press having a handrail anchored to the printing press, and a kneerail located below the handrail, comprising means for swiveling the kneerail and means for releasably locking the kneerail both in an inwardly swiveled position wherein it blocks access to the platform, and in a normal position wherein it is disposed below the handrail.

Due to the structural features of the invention, it is possible for the kneerail to be moved out of its normal protective position which, however, hinders work to be performed on the printing press from the floor, into an alternative inwardly swiveled position wherein, however, it bars access to the platform. This renders it impossible for any person to gain access to the platform and to become subjected to danger as a result of careless behavior. In order to use the platform, it is necessary for the kneerail to be swiveled back out of the inwardly swiveled position thereof into the normal position thereof, so that it again becomes effective as a supplemental safety device against falling when personnel gain access to the platform. Locking the kneerail in the normal position thereof and in the inwardly swiveled position thereof may be accomplished by manually operated locking means. The swiveled position of the kneerail can be stabilized only when the locking device is latched. The lower normal position of the kneerail can be secured by means of locking elements which automatically take effect under the weight of the kneerail. It is, however, advantageous to construct the locking devices with elements which latch automatically and can be released again either manually or by other auxiliary means. Locking elements suitable for this purpose are commercially available. The locking of the kneerail in the normal position and in the inwardly swiveled position as well as the swiveling of the kneerail may, however, also be accomplished by motorization, for example by electrically or pneumatically actuated motorized means.

Should the automatic means fail, manual operation must be fully assured.

In accordance with another feature of the invention, the locking means include an automatic latching device for automatically latching the kneerail in the inwardly swiveled position and in the normal position thereof below the handrail. In accordance with a further feature of the invention, the handrail has a longitudinal axis and the kneerail is swivelable about the longitudinal axis of the handrail, and the invention includes struts connected to and connecting the kneerail via swivel bearings to the handrail, the struts in the inwardly swiveled position of the kneerail barring access to the platform.

In accordance with an added feature of the invention, the kneerail and the struts form a U-bar having ends mounted with the swivel bearings on the handrail.

In accordance with an additional feature of the invention, the kneerail in the inwardly swiveled position is disposed at the height of the handrail, and the struts extend transversely across the platform.

In accordance with a concomitant feature of the invention, there are provided means for assuring the effectiveness of the safety device should the automatic latching device fail.

Other features which are considered as characteristic for the invention are set forth in the appended claims.

Although the invention is illustrated and described herein as embodied in a safety device for protecting personnel against falling from a platform of a printing press, it is nevertheless not intended to be limited to the details shown, since various modifications and structural changes may be made therein without departing from the spirit of the invention and within the scope and range of equivalents of the claims.

Figure 2:
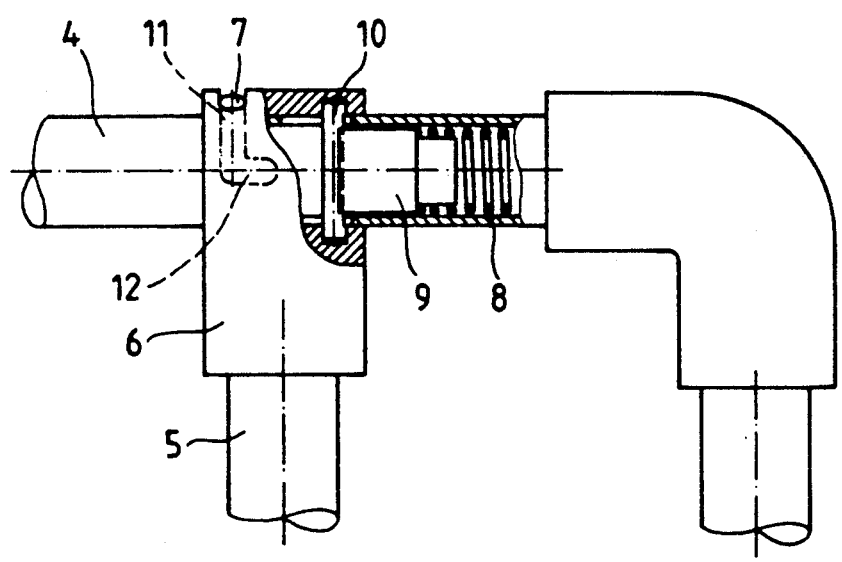

The construction and method of operation of the invention, however, together with additional objects and advantages thereof will be best understood from the following description of specific embodiments when read in connection with the accompanying drawings, in which:

FIG. 1 is a fragmentary front, side and top perspective view of a printing unit with a platform and a safety device for protecting personnel against falling which is constructed in accordance with the invention; and FIG. 2 is a much-enlarged fragmentary view of FIG. 1 showing the construction of a mechanically acting locking device for the movably arranged kneerail.

Referring now to the drawings and, first, particularly to FIG. 1 thereof, there is shown therein a safety device for protecting personnel against falling from a platform 1 which is located above a delivery 3 adjoining a printing unit 2 of a printing press. Work on a non-illustrated inking unit of the printing unit 2 or on other elements in the upper region of the printing unit 2 is performed from the platform 1. For the protection of a person who is on the platform 1, the safety device according to the invention is formed of a handrail 4 extending more-or-less horizontally and being permanently connected at several locations to the printing press, and a kneerail 5, which is situated in a region of the platform 1 located below the handrail 4 at a given distance from and extending parallel to the handrail 4. The kneerail 5 is in the shape of a U-bar, the ends of the U-bar being fastened in and via swivel bearings 6 to the handrail 4. FIG. 1 shows the kneerail 5 in the normal position thereof, in solid lines, and in the inwardly swiveled position wherein it bars access to the platform 1, in phantom. The barring of access to the platform 1 means that the kneerail 5 must first be swiveled back into the normal position thereof, wherein it performs its safety role against falling, before a person is able to gain access to the platform 1. Conversely, when work is being performed on the printing press from the floor, the kneerail 5 can be swiveled inwardly and upwardly into the position thereof shown in phantom in FIG. 1 and locked, so that work can be performed on the printing unit without any hindrance by the kneerail 5.

FIG. 2 illustrates a mechanical device for locking the kneerail in the normal position and in the inwardly swiveled position which bars access to the platform 1. According to the illustrated embodiment, the ends of the kneerail 5 shaped as a U-bar are secured to the handrail 4 via swivel bearings 6 so that the ends are rotatably moveable about the longitudinal axis of the handrail 4 and, furthermore, have limited axial displaceability. In order to limit the rotational movement, a stop pin 7 becomes effective in at least one of the two swivel bearings 6 on the handrail 4, the stop pin 7 extending through the handrail 4 and engaging, by one of its ends, in a recess 11 formed in the swivel bearings 6. The walls of the recess 11 form, in end regions 12 thereof which extend parallel to the longitudinal axis of the handrail, a swivel-proof support or receptacle for the end of the pin 7 which projects into the recess 11. The kneerail 5 is held in the respective inwardly swiveled position by a compression spring 8 having a spring force which is transmitted to the swivel bearing 6 via a thrust pad 9 and a straight or cylinder pin 10. The compression spring 8 thus shifts the kneerail 5 and the swivel bearings 6 in a direction wherein the stop pin 7 becomes engaged in the end region 12 of the recess 11, with the result that the kneerail 5 is secured in one or the other of the swiveled positions. By axial displacement of the kneerail 5 against the action of the spring, it is possible for the kneerail to be released from its locked position and then to be swiveled. Instead of the illustrated locking elements, it is also possible to provide different locking elements which may be actuated either mechanically, electrically or pneumatically. Instead of the construction of the kneerail 5 in the shape of a U-bar, a straight kneerail which is connected by struts extending to the swivel bearings 6 can be used.

The foregoing is a description corresponding in substance to German Application P 41 21 992.9, dated Jul. 3, 1991, the International priority of which is being claimed for the instant application, and which is hereby made part of this application. Any material discrepancies between the foregoing specification and the aforementioned corresponding German application are to be resolved in favor of the latter.

I claim:

1. Safety device for protecting personnel against falling from a platform of a printing press having a handrail anchored to the printing press, and a kneerail located below said handrail, comprising means for swiveling the kneerail and means for releasably locking the kneerail both in an inwardly swiveled position wherein it blocks access to the platform, and in a normal position wherein it is disposed below the handrail.

2. Safety device according to claim 1, wherein said locking means include an automatic latching device for automatically latching the kneerail in the inwardly swiveled position and in the normal position thereof below the handrail.

3. Safety device according to claim 1, wherein the handrail has a longitudinal axis and the kneerail is swivelable about said longitudinal axis of the handrail, and including struts connected to and connecting the kneerail via swivel bearings to the handrail, said struts in said inwardly swiveled position of the kneerail barring access to the platform.

4. Safety device according to claim 3, wherein the kneerail and said struts form a U-bar having ends mounted with said swivel bearings on the handrail.

5. Safety device according to claim 3, wherein the kneerail in said inwardly swiveled position is disposed at the height of the handrail, and said struts extend transversely across the platform.

6. Safety device according to claim 2, including means for assuring the effectiveness of the safety device should said automatic latching device fail.

* * * * *